US008926303B2

(12) United States Patent
Schad

(10) Patent No.: US 8,926,303 B2
(45) Date of Patent: Jan. 6, 2015

(54) VALVE ASSEMBLY FOR AN INJECTION MOLDING MACHINE

(71) Applicant: Athena Automation Ltd., Vaughan (CA)

(72) Inventor: Robert D. Schad, Toronto (CA)

(73) Assignee: Athena Automation Ltd., Vaughan (CA)

(*) Notice: Subject to any disclaimer, the term of this patent is extended or adjusted under 35 U.S.C. 154(b) by 0 days.

(21) Appl. No.: 14/199,487

(22) Filed: Mar. 6, 2014

(65) Prior Publication Data
US 2014/0255535 A1 Sep. 11, 2014

Related U.S. Application Data

(60) Provisional application No. 61/773,457, filed on Mar. 6, 2013.

(51) Int. Cl.
B29C 45/43 (2006.01)
B29C 45/34 (2006.01)
B29C 45/42 (2006.01)
B29C 45/72 (2006.01)
B29C 45/82 (2006.01)

(52) U.S. Cl.
CPC ............ B29C 45/34 (2013.01); B29C 45/4225 (2013.01); B29C 2045/7214 (2013.01); B29C 2045/822 (2013.01)
USPC ............ 425/139; 425/552; 425/556; 425/576

(58) Field of Classification Search
USPC .................................. 425/139, 552, 556, 572
See application file for complete search history.

(56) References Cited

U.S. PATENT DOCUMENTS

| 4,836,767 | A | 6/1989 | Schad et al. | |
|---|---|---|---|---|
| 6,299,431 | B1 | 10/2001 | Neter | |
| 6,391,244 | B1 | 5/2002 | Chen | |
| 7,303,387 | B2 * | 12/2007 | Hutchinson et al. | 425/547 |
| 7,591,975 | B2 * | 9/2009 | Kintzinger et al. | 264/571 |
| 7,717,697 | B2 * | 5/2010 | Hutchinson et al. | 425/552 |

FOREIGN PATENT DOCUMENTS

EP 1515829 8/2008

* cited by examiner

Primary Examiner — Tim Heitbrink
(74) Attorney, Agent, or Firm — Bereskin & Parr LLP/S.E.N.C.R.L., s.r.l.

(57) ABSTRACT

A valve assembly for use with a part handling assembly of an injection molding machine includes a housing having a first tooling port for fluid communication with a first set of receivers on the part handling apparatus and a second tooling port for fluid communication with a second set of receivers on the part handling apparatus. First and second vacuum channels extend through the housing and are provided with respective first and second vacuum closure members to provide selective fluid communication between a vacuum source and the first and second tooling ports, respectively. First and second pressure channels extend through the housing and are provided with respective first and second pressure closure members to provide selective fluid communication between a pressurized fluid source and the first and second tooling ports, respectively. The first pressure closure member is moveable independently from the first vacuum closure member, and the second pressure closure member is moveable independently from the second vacuum closure member.

22 Claims, 14 Drawing Sheets

VALVE ASSEMBLY FOR AN INJECTION MOLDING MACHINE

This application claims the benefit of Provisional Application Ser. No. 61/773,457, filed Mar. 6, 2013, which is hereby incorporated herein by reference.

FIELD

The disclosure relates to injection molding machines and valve assemblies for use with part handling apparatuses used with injection molding machines.

BACKGROUND

U.S. Pat. No. 4,836,767 (Schad) relates to an apparatus for producing molded plastic articles which is capable of simultaneously producing and cooling the plastic articles. The apparatus has a stationary mold half having at least one cavity, at least two mating mold portions, each having at least one core element, mounted to a movable carrier plate which aligns a first one of the mating mold portions with the stationary mold half and positions a second of the mating mold portions in a cooling position, a device for cooling the molded plastic article(s) when in the cooling position, and a device for moving the carrier plate along a first axis so that the aligned mold portion abuts the stationary mold half and the second mating mold portion simultaneously brings each plastic article(s) thereon into contact with the cooling device. The carrier plate is also rotatable about an axis parallel to the first axis to permit different ones of the mating mold portions to assume the aligned position during different molding cycles.

U.S. Pat. No. 6,299,431 (Neter) discloses a rotary cooling station to be used in conjunction with a high output injection molding machine and a robot having a take-out plate. A high speed robot transfers warm preforms onto a separate rotary cooling station where they are retained and internally cooled by specialized cores. The preforms may also be simultaneously cooled from the outside to speed up the cooling rate and thus avoid the formation of crystallinity zones. Solutions for the retention and ejection of the cooled preforms are described. The rotary cooling station of the present invention may be used to cool molded articles made of a single material or multiple materials.

U.S. Pat. No. 6,391,244 (Chen) discloses a take-out device for use with a machine for injection molding plastic articles such as PET preforms. The take-out device has a plurality of cooling tubes that receive hot preforms from the molding machine, carry them to a position remote from the molds of the machine for cooling, and then eject the cooled preforms onto a conveyor or other handling apparatus. The preforms are retained within the cooling tubes by vacuum pressure, but are then ejected by positive air pressure. A retaining plate spaced slightly outwardly beyond the outer ends of the cooling tubes is shiftable into a closed position in which it momentarily blocks ejection of the preforms during the application positive air pressure, yet allows them to be dislodged slightly axially outwardly from the tubes. Such slight dislodging movement is inadequate to vent the air system to atmosphere such that sufficient dislodging air pressure remains in tubes where the preforms might otherwise tend to stick and resist ejection. After the momentary delay, the plate is shifted to an open position in which all of the dislodged preforms are freed to be pushed out of the tubes by the air pressure. Preferably, the retaining plate is provided with specially shaped holes having pass-through portions that become aligned with the tubes when the plate is in its open position, and smaller diameter blocking portions that become aligned with the tubes when the plate is in its closed position. The smaller diameter blocking portions exceed the diameter of the neck of the preforms but are smaller in diameter than the flanges of the preforms such that surface areas around the blocking portions overlie the flanges to block ejection of the preforms as they undergo their dislodging movement.

EP Pat. No. 1515829 (Unterlander) relates to a method and apparatus for cooling molded plastic articles after molding is finished. In particular, the disclosed invention relates to method and apparatus for a post mold cooling ("PMC") device having at least two opposed faces. The method and apparatus are, according to the inventors, particularly well suited for cooling injection molded thermoplastic polyester polymer materials such as polyethylene terephthalate ("PET") preforms.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to some aspects of the teaching disclosed herein a valve assembly for use with a part handling apparatus having at least two sets of receivers may include a housing having a first tooling port for fluid communication with a first set of receivers on the part handling apparatus and a second tooling port for fluid communication with a second set of receivers on the part handling apparatus.

A first vacuum channel may extend through the housing and may provide fluid communication between the first tooling port and a vacuum source. A first vacuum closure member may be moveable between an open position, in which the first vacuum channel is open, and a closed position, in which the first vacuum channel is blocked, to selectably permit fluid communication between the first tooling port and the vacuum source.

A first pressure channel may extend through the housing and may provide fluid communication between the first tooling port and a pressurized fluid source. A first pressure closure member may be moveable between an open position, in which the first pressure channel is open, and a closed position, in which the first pressure channel is blocked, to selectably permit fluid communication between the first tooling port and the pressurized fluid source. The first pressure closure member may be moveable independently from the first vacuum closure member.

A second vacuum channel may extend through the housing and may provide fluid communication between the second tooling port and the vacuum source. A second vacuum closure member may be moveable between an open position, in which the second vacuum channel is open, and a closed position, in which the second vacuum channel is blocked, to selectably permit fluid communication between the second tooling port and the vacuum source.

A second pressure channel may extend through the housing and may provide fluid communication between the second tooling port and the pressurized fluid source. A second pressure closure member may be moveable between an open position, in which the first pressure channel is open, and a closed position, in which the second pressure channel is blocked, to selectably permit fluid communication between the second tooling port and the pressurized fluid source. The second pressure closure member may be moveable independently from the second vacuum closure member.

The first vacuum closure member may be moveable independently from the second vacuum closure member.

The housing may also include a vacuum port. The first vacuum channel may extend between the vacuum port and the first tooling port. The second vacuum channel may extend between the vacuum port and the second tooling port.

The first vacuum closure member may be the only closure member operable to block the first vacuum channel between the vacuum port and the first tooling port.

The second vacuum closure member may be the only closure member fluidly connected between the vacuum port and the second tooling port.

A vacuum header may be disposed within the housing and may extend from and be in fluid communication with the vacuum port. The vacuum header may include a portion of both the first and second vacuum channels.

The housing may include a pressure port. The first pressure channel may extend between the pressure port and the first tooling port and the second pressure channel may extend between the pressure port and the second tooling port.

A pressure header may be disposed within the housing and may extend from and be in fluid communication with the pressure port. The pressure header may include a portion of both the first and second pressure channels.

A first internal chamber may be disposed within the housing and may form part of the first vacuum channel. The first internal chamber may be in fluid communication with first tooling port and may include a first vacuum opening providing fluid communication between the vacuum header and the first internal chamber. When the first vacuum closure member is in the closed position the first vacuum closure member may seal the first vacuum opening.

The first internal chamber further may include a first pressure opening providing fluid communication between the pressure header and the first internal chamber. When the first pressure closure member is in the closed position the first pressure closure member may seal the first pressure opening.

A second internal chamber may be spaced apart from the first internal chamber and may be disposed within the housing. The second internal chamber may form part of the second vacuum channel, may be in fluid communication with the second tooling port, and may comprising a second vacuum opening providing fluid communication between the vacuum header and the second internal chamber. When the second vacuum closure member is in the closed position the second vacuum closure member may seal the second vacuum opening.

The second internal chamber may also include a second pressure opening providing fluid communication between the pressure header and the second internal chamber. When the second pressure closure member is in the closed position the second pressure closure member may seal the second pressure opening.

The first vacuum opening may define a first vacuum opening fluid flow area and the first pressure opening may defined a first pressure opening fluid flow area, and the first vacuum opening fluid flow area may be at least 200% larger than the first pressure opening fluid flow area.

A first vacuum actuator may be drivingly connected to the first vacuum closure member and a first pressure actuator drivingly may be connected to the first pressure closure member. The first vacuum actuator may be actuatable independently from the first pressure actuator.

The first vacuum closure member may be translatable along a first vacuum axis between the open and closed positions.

The first pressure closure member may be translatable along a first pressure axis between the open and closed positions, and the first vacuum axis may be generally parallel to and spaced apart from the first pressure axis.

The second vacuum closure member may be translatable along a second vacuum axis between its open and closed positions. The second vacuum axis may be generally parallel to and spaced apart from the first vacuum axis.

The housing may be of unitary, integrally formed one-piece construction.

The first vacuum channel may be sized to accommodate a volumetric flow rate of between about 100 liters per minute and about 750 liters per minute.

A vacuum selector valve may be disposed in fluid communication between the vacuum source and the first tooling port.

According to another broad aspect of the teachings described herein, a part handling assembly for use with an injection molding machine may include a part handling apparatus having at least a first set of receivers for receiving a first set of molded articles and a second set of receivers for receiving a second set of molded articles. The part handling assembly may also include the valve assembly described above.

DRAWINGS

The drawings included herewith are for illustrating various examples of articles, methods, and apparatuses of the teaching of the present specification and are not intended to limit the scope of what is taught in any way.

In the drawings:

FIG. 2A is a top view of the article of FIG. 2;

FIG. 2B is a cross-sectional view of the article of FIG. 2A, taken along the lines 2B-2B;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
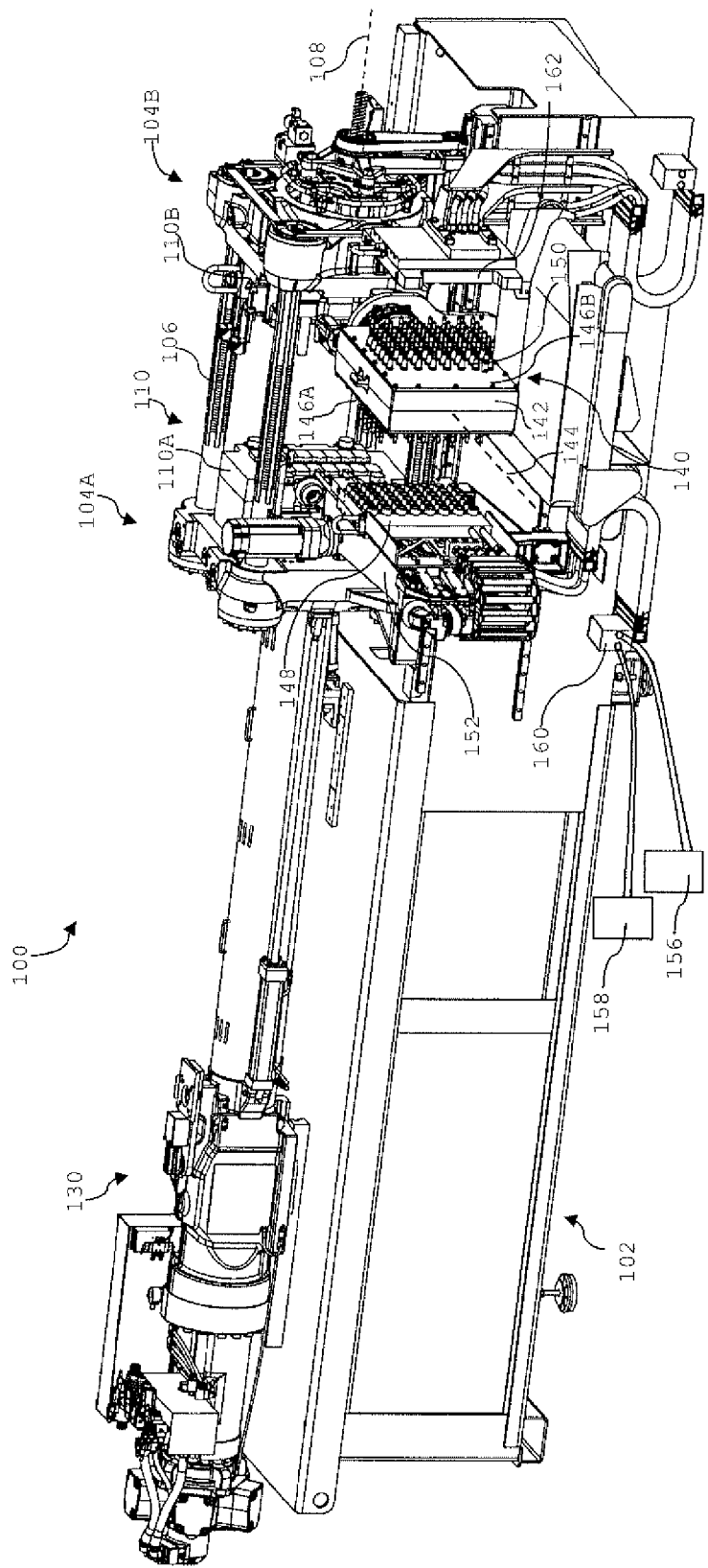
FIG. 1 is a back perspective view of an injection molding machine.

Referring to FIG. 1, an example of an injection molding machine 100 includes a base 102, with a stationary platen 104a and a moving platen 104b mounted to the base and coupled together via tie bars 106 (some of which are not illustrated in FIG. 1). The moving platen 104b can translate towards and away from the stationary platen 104a along a machine axis 108. A mold 110 is formed between the platen. The mold is defined at least in part by a first mold half 110a mounted to the stationary platen 104a, and a second mold half 110b mounted to the moving platen 104b.

Figure 2:
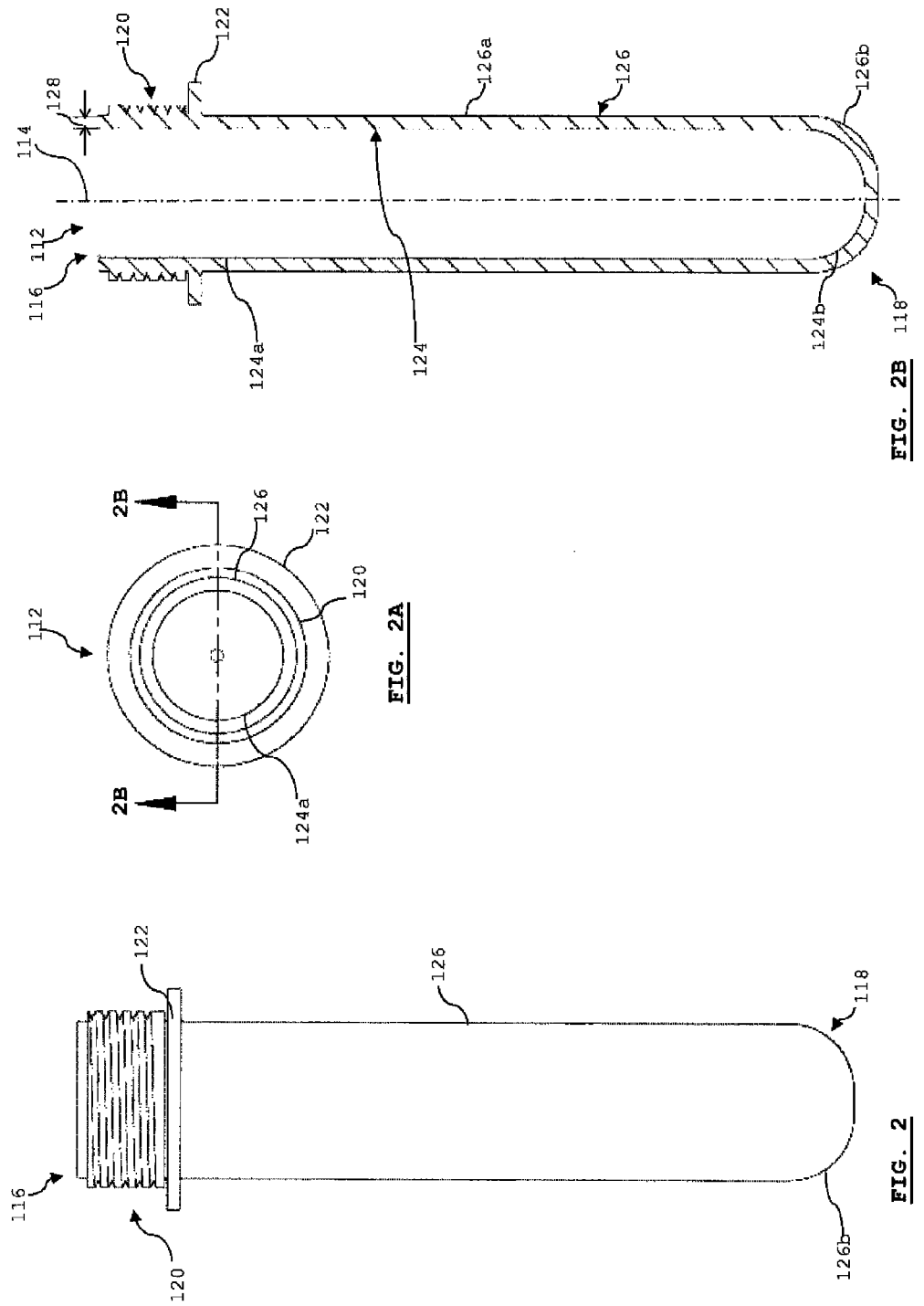
FIG. 2 is a front view of an exemplary article formed by the machine of FIG. 1.

In the example illustrated, the injection molding machine 100 is shown set up for molding preforms that can be used as input material for subsequent processing, for example, a blow molding operation to produce beverage containers. With reference to FIG. 2, an exemplary preform 112 comprises a generally elongate tubular article extending along a preform axis 114, and having opposing open and closed ends 116, 118. A threaded portion 120 for receiving a closure may be provided adjacent the open end 116. A radially outwardly extending annular flange 122 may be disposed adjacent the threaded portion 120, with the threaded portion 120 disposed axially between the open end 116 and the flange 122. The preforms have an inner surface 124 that can include a generally cylindrical inner wall portion 124a along the axial extent of the preform (between the open and closed ends), and a generally concave inner end portion 124b at the closed end. The preforms 112 have an outer surface 126 spaced apart from the inner surface 124 that can include a generally cylindrical outer wall portion 126a along the axial extent of the preform and a convex outer end portion 126b at the closed end. The spacing between the inner and outer surfaces 124, 126 generally defines a preform wall thickness 128.

With reference again to FIG. 1, an injection unit 130 is mounted to the base 102 for injecting resin or other mold material into the mold 110 to form a molded article. In the example illustrated for producing the preforms, the first mold half 110a (attached to the stationary platen 104a) can comprise a cavity side of the mold having recesses (or mold cavities—not shown) for forming the outer surface of the preforms 112. The second mold half 110b can comprise a core side of the mold having mold core pins 132 for insertion into the mold cavities and forming the inner surface 124 of the preforms 112. In the example illustrated, the machine 100 has an equal quantity of mold cavities and mold pins, this quantity defining the cavitation number of the mold 110. Typical mold cavitation numbers include 16, 32, 48, 96 or more. In the example illustrated, the mold cavitation number is 16, and the mold has 16 mold cavities and 16 mold pins, arranged in a 2×8 matrix.

The injection molding machine 100 is, in the example illustrated, provided with a part-handling assembly for moving and/or treating articles formed in the mold 110 of the machine 100. A part-handling assembly may include one or more part handling apparatuses, including, for example a cooling shell, a take-out plate, an end station, a robot, a conveyor and any other suitable members.

In the illustrated example, the part-handling assembly 140 includes a rotary cooling shell 142 having a plurality of sides, each side rotatable together with the cooling shell about a shell axis 144. In the example illustrated, the shell axis 144 is generally horizontal and perpendicular to the machine axis 108. The cooling shell 142 has (in the example illustrated) two generally planar sides including a first side 146a and a second side 146b, the two sides generally parallel and on opposed sides of the axis 144. At least one side of the cooling shell 142 is provided with a plurality of receivers for receiving and handling the preforms, and the shell receivers can be in the form of pins.

In the illustrated example, the part-handling assembly 140 also includes a take-out plate 148 that is movable between the mold 110 and the cooling shell 142 for transferring articles therebetween. The take-out plate 148 generally transfers articles from the mold 110 to a position outside the mold 110 for engagement by the shell receivers, in the form of pins 150, on the cooling shell 144. The take-out plate 148 is joined to a robot 152 that can translate the take-out plate 148 between at least one advanced position in which the take-out plate 148 is disposed between the mold halves 110a, 110b and at least one retracted position in which the take-out plate 148 is clear of the mold 110.

Figure 3:
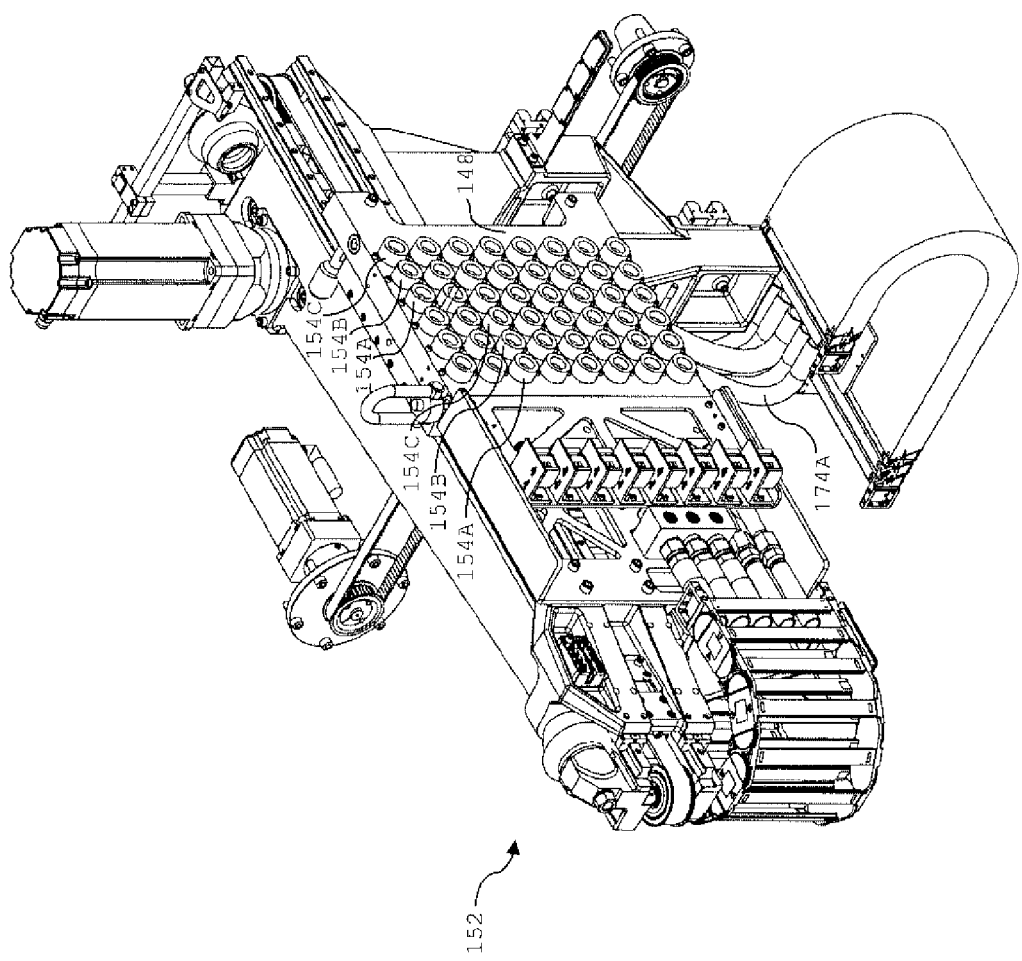
FIG. 3 is a perspective view of a portion of the machine of FIG. 1, showing part handling features in greater detail.

Referring to FIG. 3, the take-out plate has a quantity of receivers for receiving molded articles from within the mold 110. In the illustrated example, the receivers include a plurality of transfer tubes 154 for receiving molded articles from the mold core pins 132. The quantity of transfer tubes 154 can be equal to or greater than the cavitation number of the mold 110. In the example illustrated, the quantity of transfer tubes 154 provided on the take-out plate 148 comprises three sets of 16 tubes each—first set tubes 154a, second set tubes 154b, and third set tubes 154c, for a total of 48 transfer tubes 154. The first set transfer tubes 154a of the take-out plate 148 are, in the example illustrated, spaced apart from each other in a tube pattern of eight rows and two columns that matches the pin pattern. The tubes of the second and third transfer tube sets 154b, 154c are similarly spaced apart from each other in the same tube pattern of eight rows and tubes columns, and in the example illustrated, are interlaced with first set tubes 154a.

In the example illustrated, the take-out plate 148 can be moved to a first advanced position in which the first set tubes 154a are aligned with the mold core pins 132 to receive preforms therefrom. The take-out plate 148 can also be moved to a second advanced position in which the second set tubes 154b are aligned with the mold core pins 132, and to a third advanced position in which the third set tubes 154c are aligned with the mold core pins 132.

The take-out plate 148 can also be moved to at least one retracted position for selectively aligning the transfer tubes 154a-c with pins of the shell 142 at a load station. In the example illustrated, the take-out plate 148 is movable relative to the cooling shell 142 to one retracted position in which the 48 transfer tubes are each simultaneously aligned with respective ones of the 48 cooling pins 150 of a shell side 146a or 146b in the load station. The first set tubes 154a are aligned with the first set cooling pins, the second set tubes 154b are aligned with the second set cooling pins, and the third set tubes 154c are aligned with the third set cooling pins.

The transfer tubes 154 can be provided with any suitable means or mechanism for receiving, retaining and optionally ejecting the molded articles from within the transfer tubes. Optionally, the transfer tubes 154 may also be configured to cool the preforms contained therein, and may themselves be liquid cooled or otherwise cooled. In the illustrated example, each transfer tube 154 is selectably connectable to any suitable vacuum source 156, and any suitable pressurized fluid (e.g. air) source 158, to alter the pressure within the transfer tube 154. When receiving molded articles from the mold pins 132 the transfer tubes 154 can be connected to the vacuum source whereby pressure within the transfer tubes 154 is reduced and molded articles can be sucked of the mold pins 132 and into the tubes 154. After transferring the preforms into the tubes 154, the vacuum can be maintained, at the same level or at a different level (for example, a lower level of vacuum) to retain the molded articles within the transfer tubes 154 while the take-out plate 148 is removed from the mold area.

To eject the molded articles from the transfer tubes 154 the vacuum suction can be replaced with a supply or blast of pressurized air, whereby the molded articles can be ejected from the transfer tubes 154. Parts ejected from the transfer tubes may be transferred to the cooling shell 142 (in the example illustrated) or may be dropped to a conveyor belt or other conveyance means.

Optionally, the supply of vacuum and pressurized air to the transfer tubes 154 may be independently controlled for each set of transfer tubes 154a, 154b and 154c. Such independent control may enable a first vacuum to be applied to the first set of transfer tubes 154a (e.g. to draw a first set of molded articles into the tubes), while a second lower vacuum is applied to the second or third sets of transfer tubes 154b and 154c. This may be desirable when the second and/or third sets of transfer tubes 154b and 154c are empty as it may help reduce the amount of ambient air sucked into the vacuum system. This may reduce the required size and/or capacity of the vacuum source 156. When handling multiple sets of molded articles in respective sets of the transfer tubes 154a-c, it may be desirable to eject one set of molded articles from its transfer tubes without necessarily having to eject the other set of molded articles from their tubes. Providing independent control of the vacuum and pressurized air supplies to each set of transfer tubes may help facilitate such controlled, selected ejection of a given set of molded articles.

Referring to FIG. 1, in the illustrated example the injection molding machine includes a valve assembly 160 that is configured to regulate the supply of pressurized air and vacuum suction to each set of transfer tubes 154 on the take-out plate 148. Optionally, additional valve assemblies may be provided to regulate the supply of pressurized air and/or vacuum suction to other groups or sets of receivers on an injection molding machine, including for example retaining pins, cooling pins, and/or cooling tubes provided in a secondary end station 162. In the example illustrated, the valve assembly 160 is connected in fluid communication between the vacuum source 156, the pressurized air source 154 and the take-out plate 148.

Figure 4:
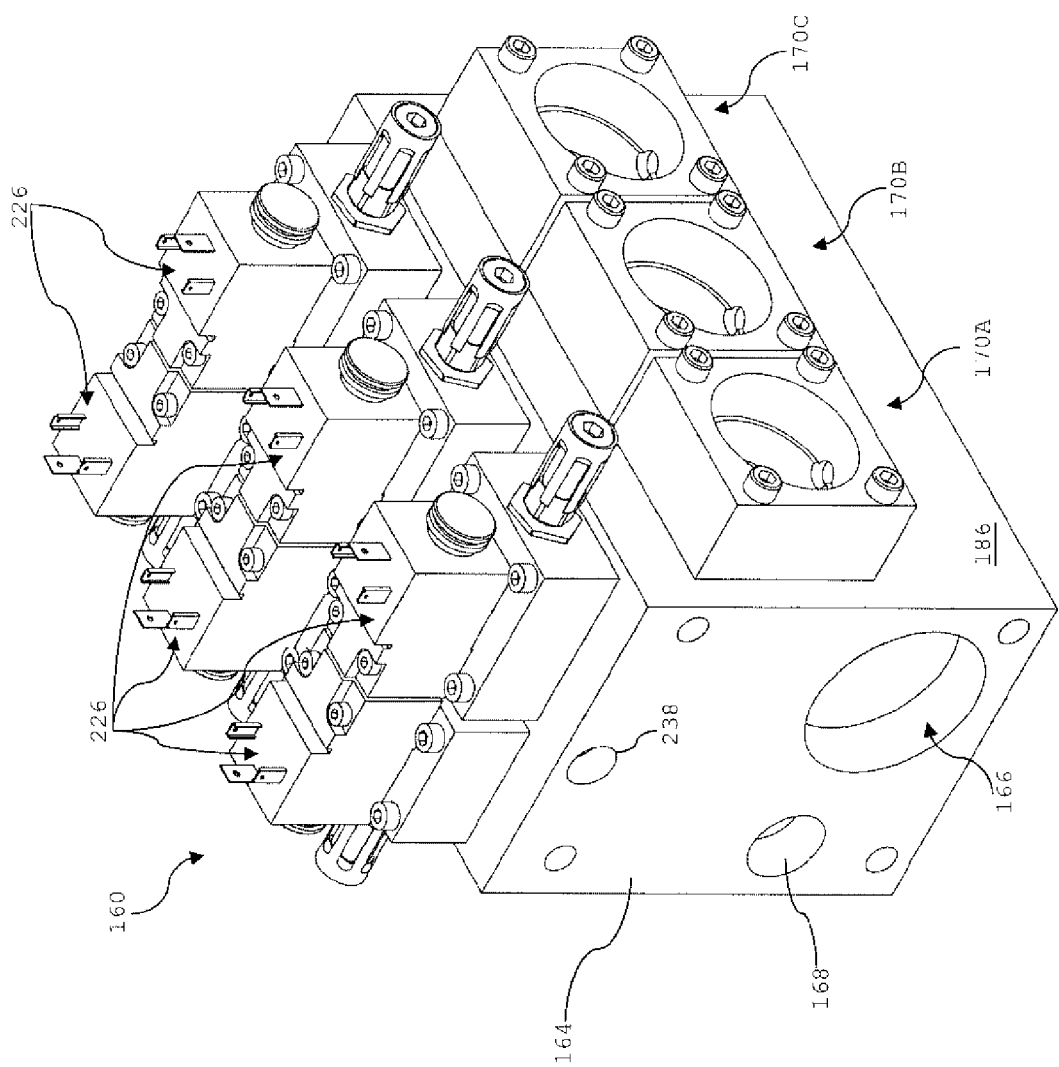
FIG. 4 is a perspective view of a valve assembly.

Referring to FIG. 4, in the illustrated example the valve assembly 160 includes a housing 164 having at least one vacuum port 166 that is fluidly connectable to the vacuum source 156 using any suitable means, such as a hose, pipe or other conduit, and at least one pressure port 168 that is fluidly connectable to a pressurized fluid source 158 using any suitable means, such as a hose, pipe or other conduit.

As explained above, in the illustrated example the take-out plate 148 includes three sets of transfer tubes 154a-c, and the valve assembly includes three valve sub-assemblies 170a, 170b, 170c (one valve assembly 170 corresponding to each set of transfer tubes 154a-c) operable to independently control the supply of vacuum suction and/or pressurized fluid to each set of transfer tubes 154. In the illustrated example, the valve sub-assemblies 170a-c are generally identical and operate in the same manner. Providing identical valve sub-assemblies may help provide consistent performance within each sub-assembly and may help reduce the complexity and/or cost of manufacturing the valve assembly 160. Alternatively, the valve sub-assemblies need not be identical.

A first valve sub-assembly 170a is described in greater detail herein, and it is understood that in the example illustrated the second and third valve sub-assemblies 170b and 170c include analogous features, identified where appropriate using analogous reference characters with "b" and "c" suffixes respectively, and can operate in an analogous way.

Figure 6:
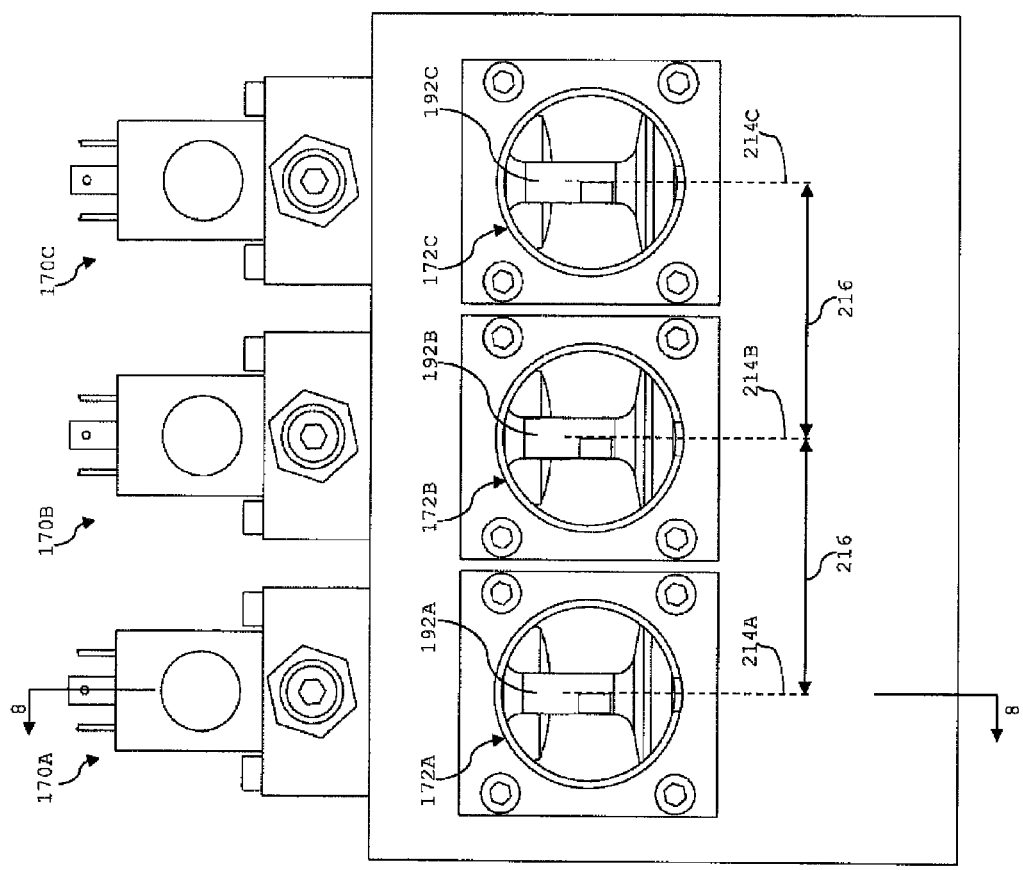
FIG. 6 is a front view of the valve assembly of FIG. 4.

Referring to FIG. 6, the first valve sub-assembly 170a includes a tooling port 172a that is fluidly connected to the first set of transfer tubes 154a on the take-out plate 148 via a hose (hoses 174a in FIG. 3). While illustrated as generally circular in cross-sectional area, the tooling port 172a may be of any suitable shape or configuration.

Figure 5:
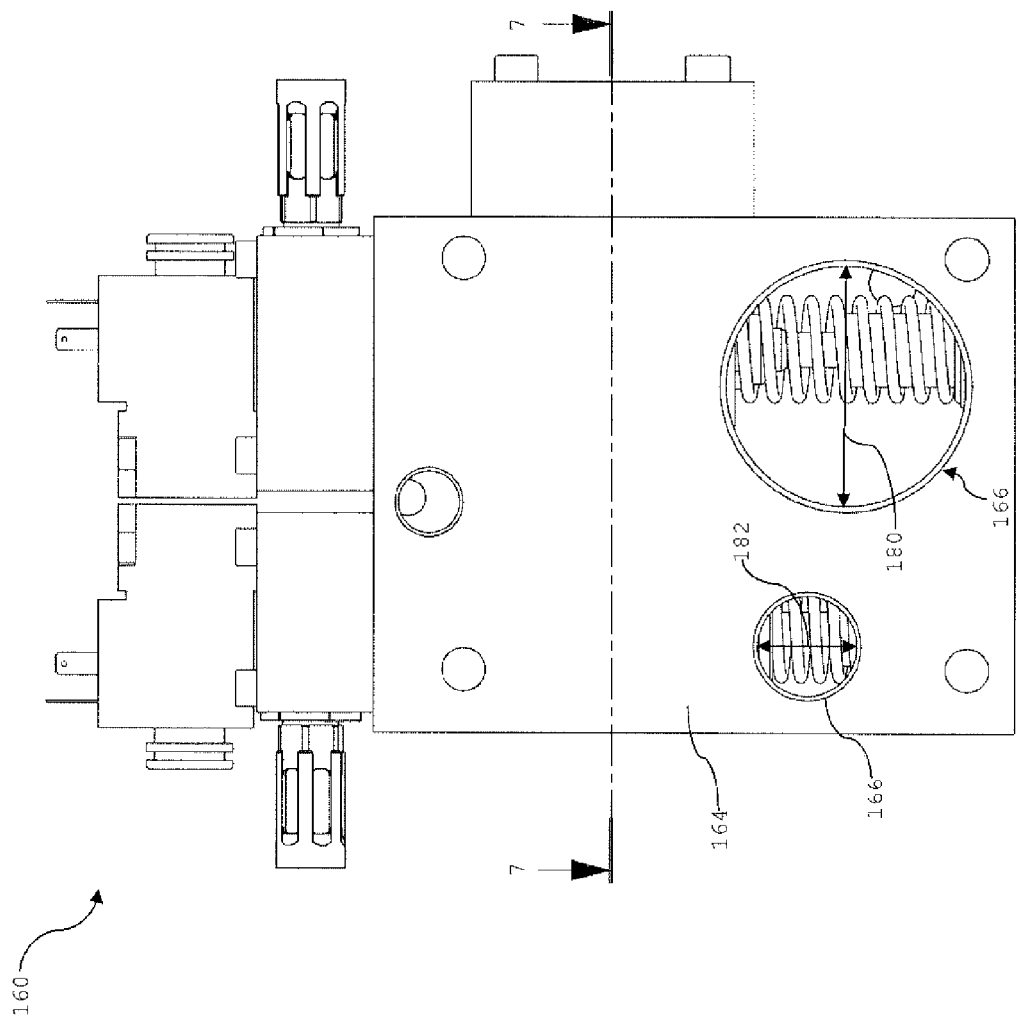
FIG. 5 is an end view of the valve assembly of FIG. 4.

In the illustrated example, the tooling port 172a can function as an inlet port when providing vacuum suction to the transfer tubes 154a, and as an outlet port when providing pressurized air to the transfer tubes 154a. The tooling port 172a has a tooling port diameter 178a (FIG. 7) and a corresponding tooling port cross-sectional flow area. The tooling port diameter 178a, and related area, may be selected to facilitate a desired fluid flow rate through the tooling port 172a for both the vacuum and pressurized fluid flows. Optionally, the tooling port diameter 178 may be sized so that it is greater than the diameter 180 of the pressure port 168 (FIG. 5), and may be generally equal to the diameter 180 of the vacuum port 166. Alternatively, the tooling port diameter 178 can be selected so that the flow area of the tooling port 172a is greater than the flow area of the pressure port 168 and is less than the flow area of the vacuum port 166. Sizing the tooling port 172a to accommodate the desired vacuum fluid flow volume may help ensure that the tooling port 172a can accommodate both the vacuum fluid flow volume and the high pressure fluid flow volume. In the illustrated example, the diameter 178a of the tooling port 172a may be between about 10 mm and about 100 mm, or may be greater than 100 mm. The diameter 180 of the vacuum port 166 may be between about 10 mm and about 100 mm, or may be greater than 100 mm. The diameter 182 of the pressure port 168 (FIG. 5) may be between about 5 mm and about 60 mm, or may be greater than 60 mm. Optionally, the diameter 178a of the tooling port 172a may be at least 200% of the diameter 182a of the pressure port 168, and/or may be between about 80% and about 120%, of the diameter 180 of the vacuum port 166.

To provide vacuum communication between the vacuum port 166 and the tooling port 172a, a vacuum channel 234a (FIG. 9) is provided within the housing 164. The vacuum channel 234a can comprise a plurality of sections or portions, including chamber 184a and vacuum header 188 (described in detail below), that co-operate to provide the channel 234a. Portions of vacuum channel 234a may be provided in common with portions of vacuum channels 234b and 234c. For example, vacuum header 188 may be common to all of the vacuum channels 234a-c. The vacuum channel 234 can be sized to provide a desired volumetric fluid flow rate, which, for example, may be between about 100 liters per minute and about 750 liters per minute.

Figure 8:
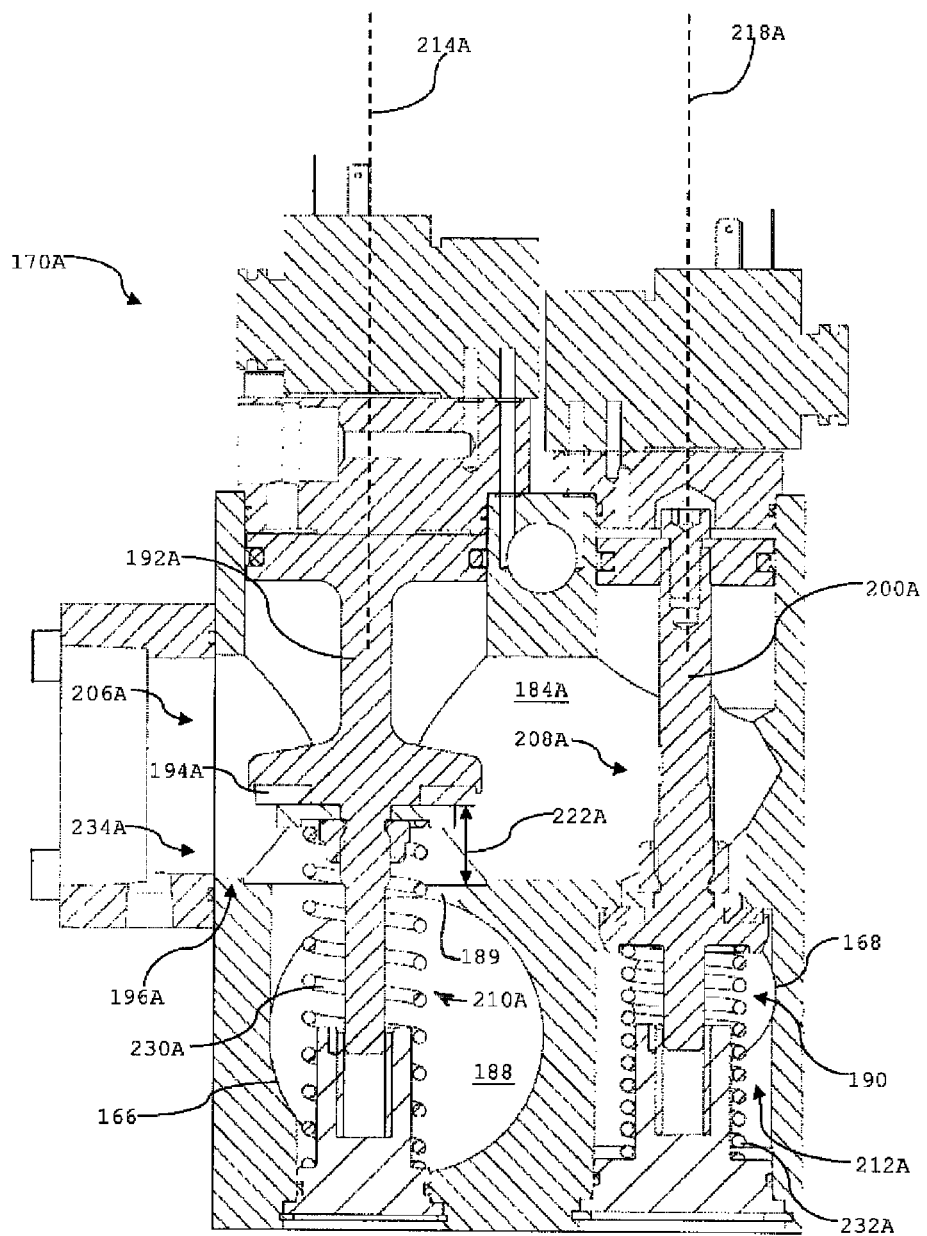
FIG. 8 is section view of a portion of the valve assembly of FIG. 4 with a vacuum closure member open, taken along line 8-8 in FIG. 4.

Referring to FIG. 8, the tooling port 172*a* is in fluid communication with a corresponding chamber 184*a* formed within the housing 164. The chamber 184*a* is selectably connectable in fluid communication with the vacuum source 156 and pressurized fluid source 158 and, in the example illustrated, forms part of the vacuum channel 234*a* between the tooling port 172*a* and the vacuum source 156.

To provide air flow communication between the pressure port 168 and the tooling port 172*a*, a pressure channel 236*a* (FIG. 9) is provided within the housing 164. The pressure channel 236*a* can comprise a plurality of sections or portions, including chamber 184*a* and pressure header 190, that cooperate to provide the channel 236*a*.

Optionally, the vacuum channel 234*a* and pressure channel 236*a* may at least partially overlap with each other and/or share at least one portion in common. In the illustrated example, the chamber 184*a* forms a portion of both the vacuum channel 234*a* and the pressure channel 236. Alternatively, the vacuum channel 234*a* and pressure channel 236 may be mutually exclusive.

Figure 7:
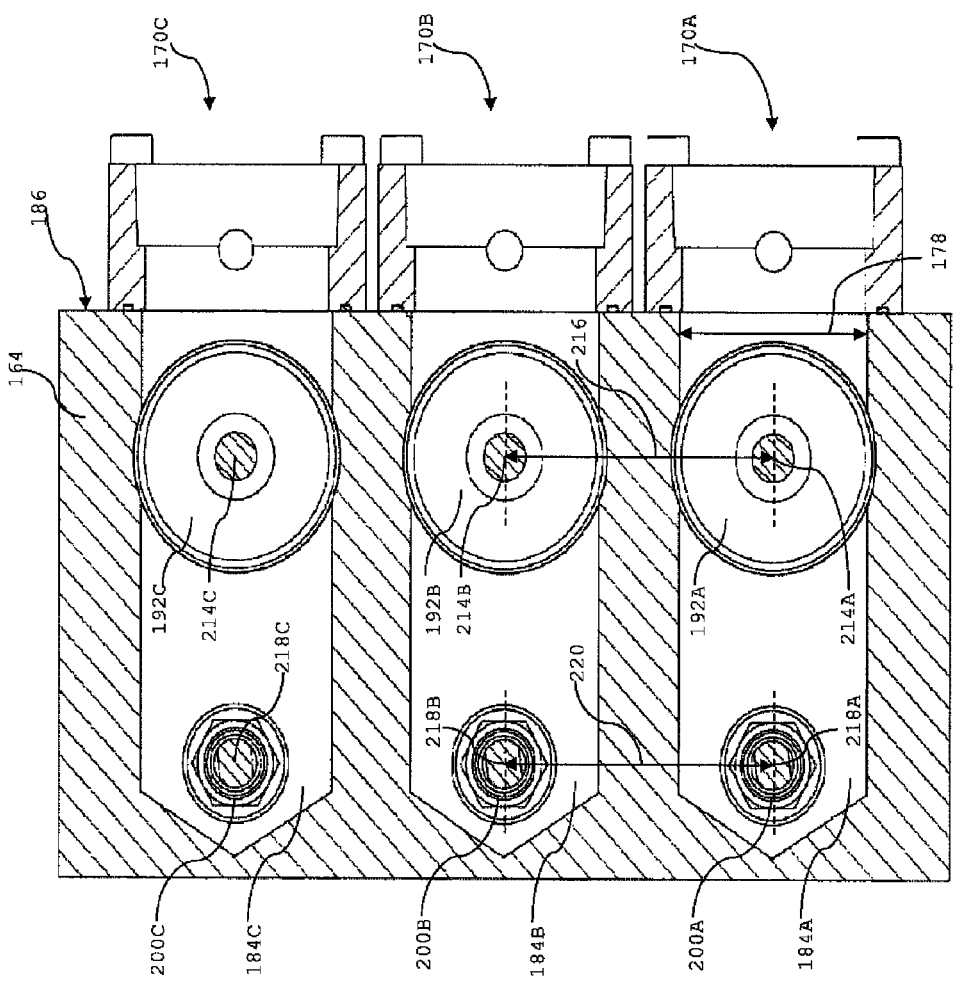
FIG. 7 is a section view of the valve assembly of FIG. 4, taken along line 7-7 in FIG. 5.

Referring to FIG. 7, in the illustrated example, the valve assembly housing 164 is of unitary, integrally formed one-piece construction and the chamber 184*a* is formed as a blind hole machined in the housing 162 and extending inwardly from a tooling port face 186 of the housing 162. Alternatively, the housing 162 may be of multi-piece construction, and the chambers 184*a-c* may be formed in any suitable manner.

Referring to FIG. 8, the housing 164 includes a vacuum header 188 extending from the vacuum port 166 and forming part of the vacuum channel 234, and a pressure header 190 extending from the pressure port 168 and forming part of the pressure channel 236. Each header 188, 190 extends along substantially the entire length of the valve assembly housing 164 and extends into each of the three valve sub-assemblies 170*a-c*. Each chamber 184*a-c* within the housing 164 is in selectable fluid communication with both the vacuum header 188 and the pressure header 190 thereby providing fluid communication between the chambers 184*a-c* and the vacuum source 156 and pressurized fluid source 158, respectively. In this configuration, each valve sub-assembly 170*a-c* is in fluid communication with a common vacuum source 156 and a common pressurized fluid source 158. Connecting each chamber 184*a-c* to a common vacuum header 188 and a common pressure header 190 may help balance the suction/pressure applied to each set of receivers 154*a-c*.

To provide selectable communication between the chambers 184*a-c* and the vacuum and pressure headers 188, 190, each chamber 184*a-c* includes at least one vacuum opening 189 (FIG. 8) and at least one pressure opening 191 (FIG. 9), which provide fluid communication between the chambers 184*-a-c* and the vacuum and pressure headers 188, 190, respectively, and form part of the vacuum and pressure channels 234, 236. The chambers 184*a-c* are also provided with at least one moveable closure member to seal each opening 189 and 191. In the illustrated example, each chamber 184*a-c* is formed to accommodate at least one vacuum closure member and at least one pressure closure member. Optionally, the openings 189 and 191 may be of different cross-sectional area, and the vacuum opening 189 may be larger than the pressure opening 191, and may be between about 150% to about 400% greater or more, and optionally may be at about least 200% greater.

Referring to FIG. 8, in the illustrated example a vacuum closure member 192*a* in chamber 184*a* includes a sealing member 194*a* (such as a gasket, o-ring or other suitable member) that can contact and seal against a corresponding seat 196*a* in the chamber 184*a*. The vacuum closure 192*a* is moveable between an open position (FIG. 8) in which the vacuum channel 234 is open, and a closed position (FIGS. 9 and 10) in which the vacuum channel 234 is blocked. In the open position the sealing member 194*a* is spaced apart from the seat 196*a* thereby providing a fluid passage connecting the chamber 184*a*, and tooling port 172*a*, and the vacuum header 188. In the closed position the sealing member 194*a* contacts the seat 196*a* and fluidly isolates the chamber 184*a* from the vacuum header 188.

Figure 9:
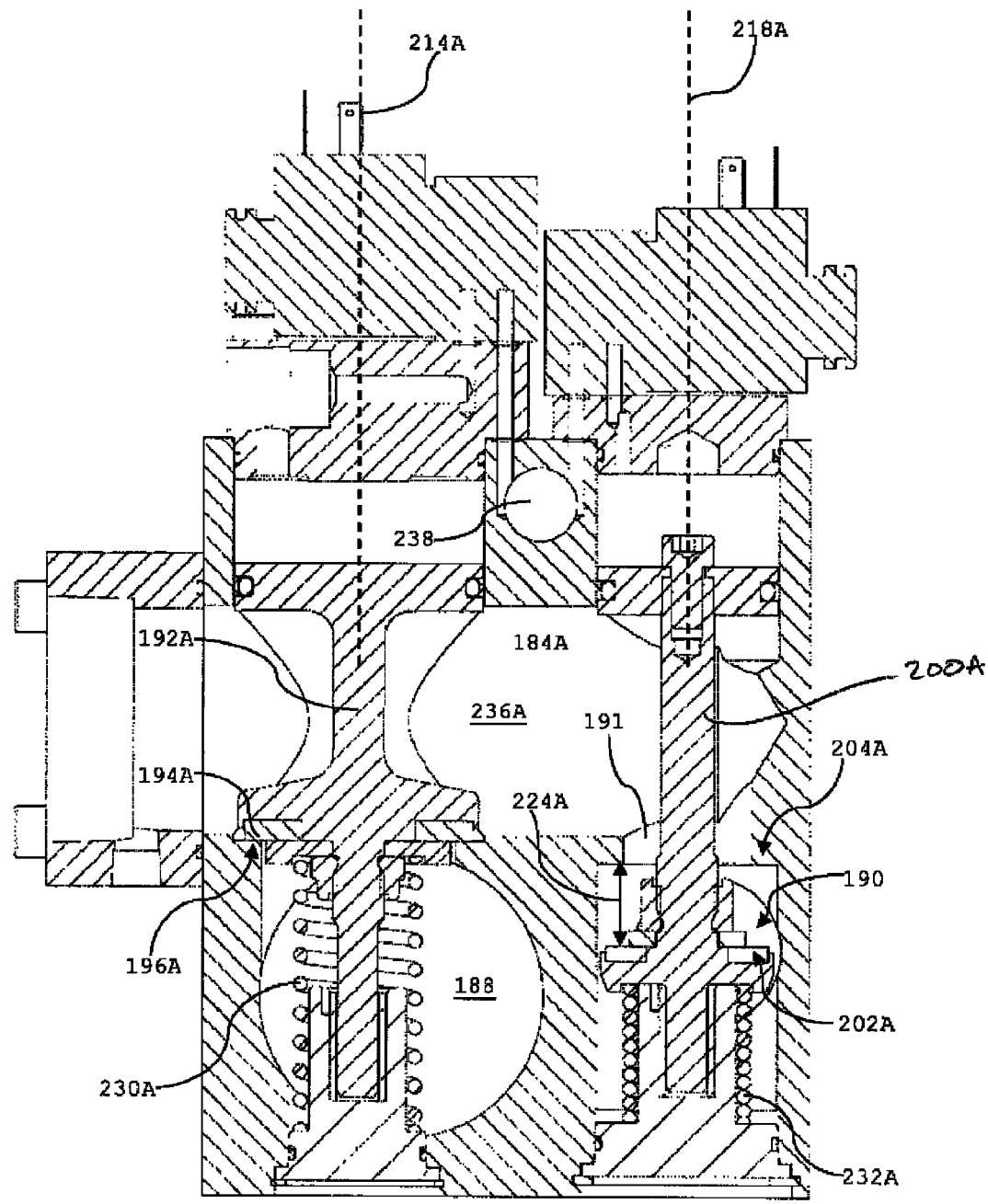
FIG. 9 is the section view of FIG. 8 with a pressure closure member open.

Similarly, referring to FIG. 9, a pressure closure member 200*a* includes a sealing member 202*a* that can contact and seal against a corresponding seat 204*a* in the chamber 184*a*. The pressure closure member 200*a* is moveable between an open position (FIG. 9) in which the pressure channel 236 is open, and a closed position (FIGS. 8 and 10) in which the pressure channel 236 is blocked. In the open position the sealing member 202*a* is spaced apart from the seat 204*a* thereby providing a fluid connection between the chamber 180*a*, tooling port 172*a*, and the pressure header 190. In the closed position the sealing member 202*a* contacts the seat 204*a* and fluidly isolates the chamber 184*a* from the pressure header 190.

In the illustrated example, an upper portion 206*a* of the vacuum closure member 192*a* and an upper portion 208*a* of the pressure closure member 200*a* is disposed within the chamber 184*a*, a lower portion 210*a* of the vacuum closure member 192 is disposed within the vacuum header 188, and a lower portion 212*a* of the pressure closure member 200*a* is disposed within the pressure header 190. Providing at least a portion of the closure members 192*a* and 200*a* within the chamber 184*a* and their respective headers 198, 200 may help reduce the overall size of the housing 164.

Referring to FIG. 6, vacuum closure member 192*a-c* is translatable along a respective axis 214*a-c*. In the illustrated example, the axes 214*a-c* are generally parallel to each other, and are spaced apart from each other along the length of the housing 164 by a distance 216. Alternatively, the housing 164 may be configured so that the axes 214*a-c* need not be parallel to each other.

Similarly, referring to FIG. 7, each pressure closure member 200*a-c* is translatable along a respective axis 218*a-c* (see also FIG. 9). In the illustrated example, the axes 218*a-c* of the pressure closure members 200*a-c* are generally parallel to each other and are spaced apart from each other along the length of the housing 160 by a distance 220. Optionally, the distance 220 can be the same as distance 216. Alternatively, the distance between the axes 214*a-c* may be different than the distance between the axes 218*a-c*. In the illustrated example, axes 218*a-c* are parallel to and spaced apart from axes 216*a-c*.

Referring to FIG. 8, in the illustrated example, the vacuum closure member 192*a* is configured to translate axially along axis 214*a* between its open and closed positions. The axial spacing 222*a* between the seal member 194*a* and the seat 196*a* when the vacuum member 192*a* is in its open position can be between about 3 mm and about 40 mm, or more. The size of the spacing 222*a* can be selected based on the size of chamber 184*a*, the number of receivers 154*a*, the diameter 180 of the vacuum port 166, and/or the diameter 178*a* of the tooling port 172*a* or other factors and can be chosen to provide a passage of sufficient size to allow for a desired amount of fluid flow from the tooling port 172*a* to the vacuum header 188. Referring to FIG. 9, the axial spacing 224*a* may be selected based on analogous factors.

Alternatively, instead of being axially translatable, at least one of the vacuum and or pressure closure members may be another type of suitable closure member having a different type of movement, including, for example, a pivoting closure member or a rotatable closure member.

In the illustrated example, the vacuum closure member 192a is the only closure member fluidly positioned between the vacuum port 166 and the tooling port 172a, and the pressure closure member 200a is the only closure member fluidly positioned between the pressure port 168 and the tooling port 172a. This may help simplify the operation of the valve assembly 160. This may also help reduce pressure losses as fluid flows through the valve assembly 160 because the fluid need not pass through multiple valves, closure members or other flow metering devices.

Preferably, at least one actuator is provided to move the vacuum closure member 192a and the pressure closure member 200a between their respective open and closed positions. In the illustrated example, a separate actuator is provided for each of the vacuum and pressure closure members. This may help facilitate independent control of each closure member 192a, 200a. The actuator may be any suitable type of actuator, including, for example, pneumatic actuators, hydraulic actuators, electric actuators, mechanical actuators and any combination thereof. Alternatively, a single actuator may be configured to independently actuate more than one closure member.

Figure 10:
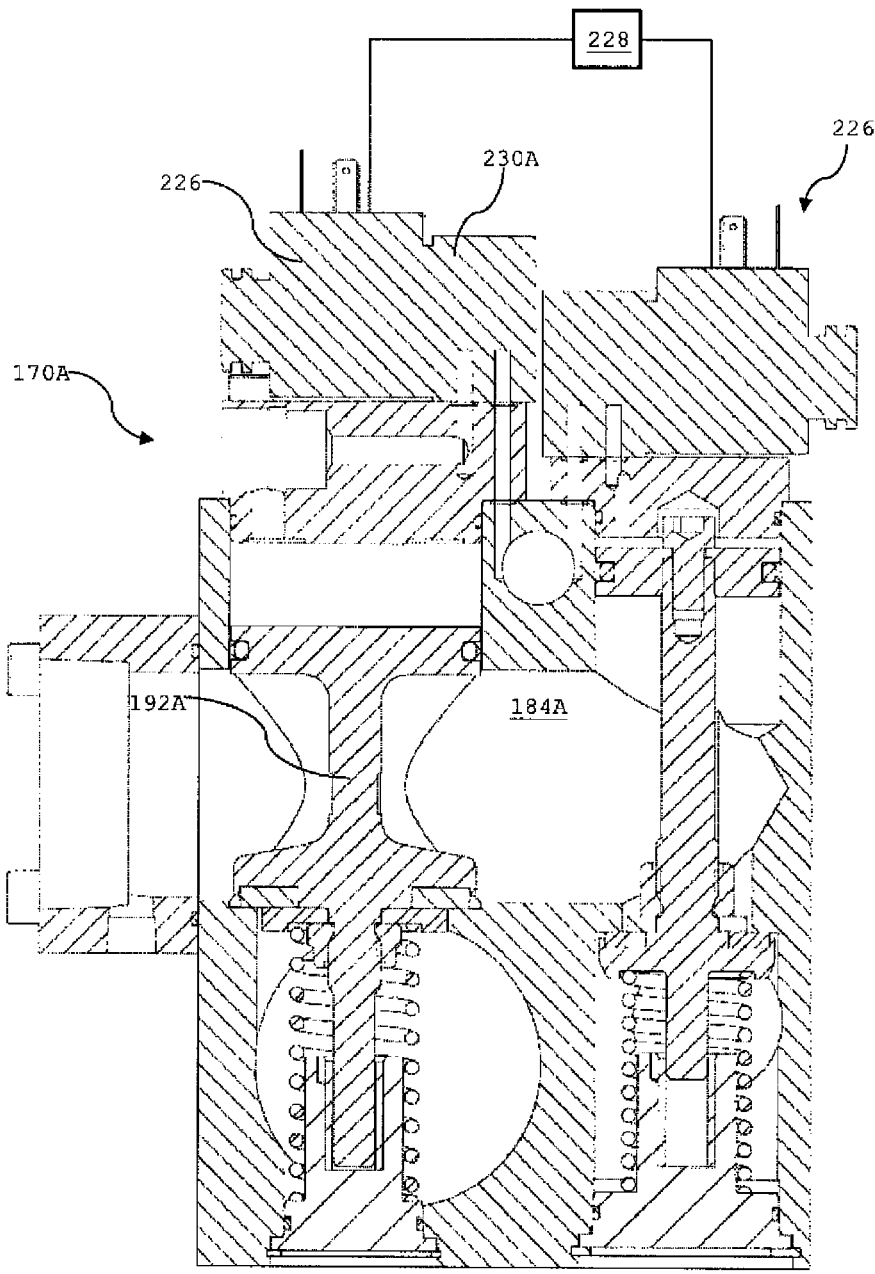
FIG. 10 is the section view of FIG. 8 with the vacuum and pressure closure members closed.

Referring to FIG. 4, an actuator 226 is drivingly connected to the vacuum closure member (see also FIG. 10. Optionally, each actuator 226 may be independently and remotely controllable, for example via a valve assembly controller 228 to provide remote control of the vacuum closure member 192a. The valve assembly controller 228 may be integrated within the control system for the injection molding machine 100, or may be provided as a separate unit.

In the illustrated example, each actuator 226 includes a solenoid 230 that can be triggered by an electric control signal to control a pressurized air flow, supplied via pilot pressure port 238, whereby the vacuum closure members 192a-c can be selectably driven toward, or held in, their closed position (FIGS. 9 and 10), and the pressure closure members 200a-c can be driven toward, or held in, their open positions (FIG. 9).

Optionally, a biasing member can be provided to bias the vacuum closure member toward its open and/or closed position. In the illustrated example, a biasing spring 230a is provided within the housing 164 and is positioned to bias the vacuum closure member 192a toward its open position (FIG. 8). To move the vacuum closure member 192a to its closed position, the actuator 226 exerts a downward force (as illustrated in FIG. 9) to overcome the biasing force exerted by the spring 230a. In the absence of an actuating force (for example during a power failure or other machine fault condition) the vacuum closure member 192a will default to its open position. This may help ensure that vacuum remains applied to the transfer tubes 154a during a fault condition. This may help retain molded articles within the transfer tubes 154a during a fault. Alternatively, the vacuum closure member 192a may be configured so that it is biased toward its closed position, and the actuator is configured to drive the vacuum closure member toward its open position.

A biasing member may be provided to bias the pressure closure member 200a toward its open and/or closed position.

In the illustrated example, a biasing spring 232a is provided within the housing 164 and is positioned to bias the pressure closure member 200a toward its closed position (FIG. 8). To move the pressure closure member 200a to its closed position, its actuator 226 exerts a downward force (as illustrated in FIG. 9) to overcome the biasing force exerted by the spring 232a. In the absence of an actuating force (for example during a power failure or other machine fault condition) the pressure closure member 200a will default to its closed position. This may help ensure that the pressurized fluid flow to the transfer tubes 154a is turned off during a fault condition.

In the illustrated example, the vacuum closure member 192a is moveable independently from the pressure closure member 200a. The vacuum closure member 192a is also moveable independently from the other vacuum closure members 192b and 192c, and the other pressure closure members 200b and 200c. This independent movement of the vacuum closure member 192a and pressure closure member 200a may help reduce or eliminate the likelihood of cross-flow between the vacuum header 188 and pressure header 190 when switching between vacuum suction and pressurized fluid flows.

For example, when switching the tooling port 172a from applying vacuum to its set of pressure tubes 154a to the application of pressurized fluid to its set of pressure tubes 154a, such independent movement allows vacuum closure member 192a to be closed before the pressure closure member 200a is opened. This may prevent fluid communication between the pressure header 190 and the vacuum header 188. Such cross-flow may have allowed at least some of the supplied pressurized fluid to be sucked out via the vacuum header 188 without reaching the tooling port 172a or tubes 154a. Similarly, the pressure closure member 200a can be closed prior to opening the vacuum closure member 192a when switching from applying pressurized fluid to applying vacuum to the first set of pressure tubes 154a.

This independent movement of each closure member 192a and 200a may also enable the valve assembly 160 to be configured to provide a plurality of operating configurations, to provide different combinations of conditions at its tooling ports 172a-c. Optionally, the valve assembly 160 can be configured so that one tooling port is under vacuum while another tooling port is receiving pressurized fluid or is off (i.e. both the vacuum closure member and pressure closure member are closed). For example, the valve assembly 160 can be configured so that the vacuum closure member 192a is open while the vacuum closure members 192b and 192c and pressure closure members 200a-c are all closed, thereby providing vacuum to tooling port 172a while, tooling ports 172b and 172c are off.

The valve assembly 160 can also be configured so that the pressure closure member 200a is open, providing pressurized fluid to tooling port 172a, while pressure closure members 200b and 220c and vacuum closure members 192a-c are closed, whereby tooling ports 172b and 172c are off.

In the illustrated example, the valve assembly 160 having three valve sub-assemblies 170a-c may be configured in a plurality of operating configurations, including, for example those illustrated below:

| Valve Sub-Assembly 170a | | | Valve Sub-Assembly 170b | | | Valve Sub-Assembly 170c | | |
|---|---|---|---|---|---|---|---|---|
| Vacuum Closure Member 192a | Pressure Closure Member 200a | Tooling Port 172a | Vacuum Closure Member 192b | Pressure Closure Member 200b | Tooling Port 172b | Vacuum Closure Member 192c | Pressure Closure Member 200c | Tooling Port 172c |
| Closed | Closed | Off | Closed | Closed | Off | Closed | Closed | Off |
| Closed | Closed | Off | Closed | Closed | Off | Open | Closed | Vacuum |
| Closed | Closed | Off | Closed | Closed | Off | Closed | Open | Pressure |
| Closed | Closed | Off | Open | Closed | Vacuum | Closed | Closed | Off |
| Closed | Closed | Off | Open | Closed | Vacuum | Open | Closed | Vacuum |
| Closed | Closed | Off | Open | Closed | Vacuum | Closed | Open | Pressure |
| Closed | Closed | Off | Closed | Open | Pressure | Closed | Closed | Off |
| Closed | Closed | Off | Closed | Open | Pressure | Open | Closed | Vacuum |
| Closed | Closed | Off | Closed | Open | Pressure | Closed | Open | Pressure |
| Open | Closed | Vacuum | Closed | Closed | Off | Closed | Closed | Off |
| Open | Closed | Vacuum | Closed | Closed | Off | Open | Closed | Vacuum |
| Open | Closed | Vacuum | Closed | Closed | Off | Closed | Open | Pressure |
| Open | Closed | Vacuum | Open | Closed | Vacuum | Closed | Closed | Off |
| Open | Closed | Vacuum | Open | Closed | Vacuum | Open | Closed | Vacuum |
| Open | Closed | Vacuum | Open | Closed | Vacuum | Closed | Open | Pressure |
| Open | Closed | Vacuum | Closed | Open | Pressure | Closed | Closed | Off |
| Open | Closed | Vacuum | Closed | Open | Pressure | Open | Closed | Vacuum |
| Open | Closed | Vacuum | Closed | Open | Pressure | Closed | Open | Pressure |
| Closed | Open | Pressure | Closed | Closed | Off | Closed | Closed | Off |
| Closed | Open | Pressure | Closed | Closed | Off | Open | Closed | Vacuum |
| Closed | Open | Pressure | Closed | Closed | Off | Closed | Open | Pressure |
| Closed | Open | Pressure | Open | Closed | Vacuum | Closed | Closed | Off |
| Closed | Open | Pressure | Open | Closed | Vacuum | Open | Closed | Vacuum |
| Closed | Open | Pressure | Open | Closed | Vacuum | Closed | Open | Pressure |
| Closed | Open | Pressure | Closed | Open | Pressure | Closed | Closed | Off |
| Closed | Open | Pressure | Closed | Open | Pressure | Open | Closed | Vacuum |
| Closed | Open | Pressure | Closed | Open | Pressure | Closed | Open | Pressure |

Varying the number of valve sub-assemblies 170 in the valve assembly 160 may vary the number and type of configurations that can be provided by a given valve assembly.

In the illustrated example, the vacuum closure member 192*a* and pressure closure member 200*a* are separate members that are moveable independently of each other. Alternatively, the vacuum closure member 192*a* and pressure closure member 200*a* may be connected to each other, formed from a single member or otherwise provided in any suitable manner while still allowing both closure members 192*a* and 200*a* to be independently, selectably opened and closed relative to each other and to be simultaneously closed when desired.

While in the example illustrated the valve assembly 160 has three valve sub-assemblies 170, optionally, the valve assembly 160 may have fewer than three or more than three valve sub-assemblies 170. The number of valve sub-assemblies may be selected based at least partially on the number of sets of receivers 154 that are to be connected to the valve assembly. Providing at least one valve sub-assembly 170 per set of receivers 154 may help facilitate independent control of the supply of vacuum suction and pressurized air to each set of receivers 154.

Optionally, in addition to be operable to provide independently selectable vacuum suction or pressurized air to each tooling port 172*a*, 172*b* and 172*c*, the valve assembly 160 may also be configured to provide more than one level of vacuum suction. Such a configuration may be useful in a variety of applications, including for example, if a relatively high level of vacuum suction is desired to transfer parts into receiving tubes 154, and only a relatively lower level of vacuum suction is required to hold the parts in the receiving tubes 154.

Optionally, to help provide multiple levels of vacuum suction, the valve assembly 160 may include a vacuum selector valve that is provided between the vacuum source 156 and the vacuum port 166. The vacuum selector valve may be incorporated within the housing 164, or provided as a separate module that is external the housing 164.

Figure 11:
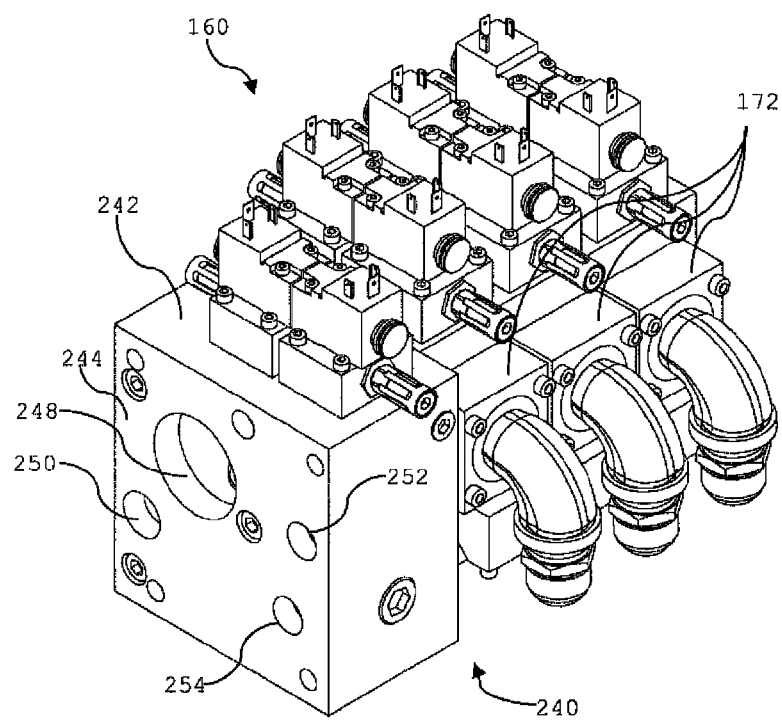
FIG. 11 is a perspective view of the valve assembly of FIG. 4 including a vacuum selector valve.

Referring to FIG. 11, one example of a vacuum selector valve 240 is positioned outside and connected to the housing 164. The selector valve includes a housing 242 having an outer face 244 (facing away from the housing 164) and a mounting face 246 (FIG. 13) facing, and abutting the end face of the housing 164).

Figure 12:
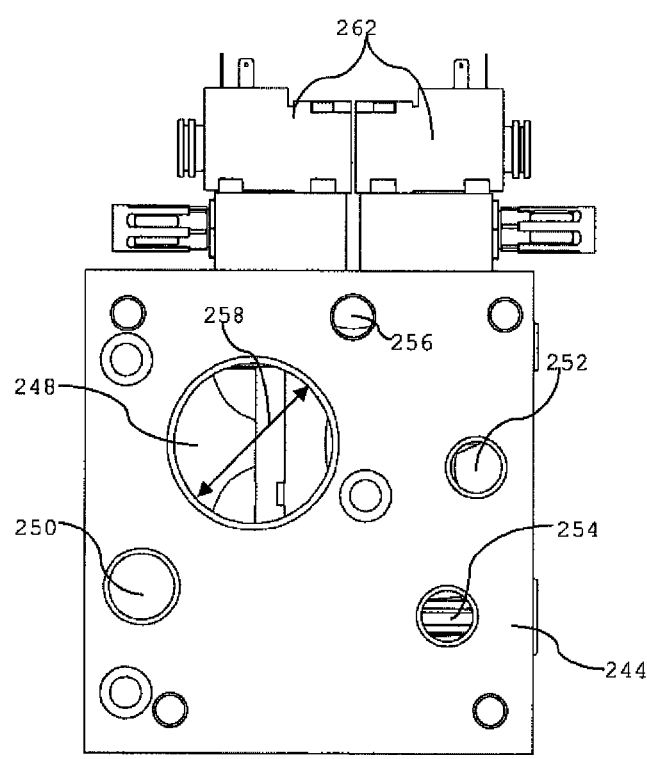
FIG. 12 is a front of the vacuum selector valve of FIG. 11.

In the illustrated example, the outer face 244 includes a high vacuum port 248, a pressurized air port 250, a vacuum brake port 252, a low vacuum port 254 and an actuator pilot pressure port 256 (FIG. 12).

Referring to FIG. 12, the high vacuum port 248 is connectable to a suitable vacuum source and has a diameter 258. The diameter 258 can be selected to accommodate a desired volume of air flow under high vacuum operation, and can be the generally the same as, or different than the diameter 180 of vacuum port 166.

The pressurized air port 250 is connectable to a supply of pressurized air, such as pressurized air source 158. In the illustrated example, when the vacuum selector valve 240 is mounted on the housing 164, the pressurized air port 252 is registered with pressure port 168 and the pressurized air port 250 is functions as an unswitched, flow through channel facilitating fluid flow between port 168 and source 158. Alternatively, the vacuum selector valve 240 may include any suitable type of closure member to selectively block the pressurized air port 252.

The vacuum brake port 252 is configured to provide an alternate source of air that can be drawn into the vacuum system, in alternative to or in addition to air that is drawn in through one of the tooling ports 172*a-c*. The vacuum brake port 252 may be connected to any suitable supply of air, or, as in the illustrated example, may simply be in communication with the surrounding atmosphere. Optionally, a filter member (not shown) may be used to screen air entering the vacuum brake port 252.

The low vacuum inlet port 254 can be connected to any suitable vacuum source, including for example, source 156. In the illustrated example, the low vacuum port 254 has a diameter 260 that is smaller than the diameter 258 of high vacuum port 248. Having a smaller diameter may limit the volume of fluid that can flow through the low vacuum port 254 relative to the high vacuum port 248 when coupled to a similar upstream vacuum source.

The pilot pressure port 256 extends through the housing 242. When the housing 242 is mounted on the housing 164, the pilot pressure port 256 is registered with pilot pressure port 238 and provides fluid communication between port 238 and its fluid source. Pilot pressure port 256 also supplies fluid to actuators 262, which may be any suitable actuator, but in the example illustrated are generally similar to actuators 226.

Figure 13:
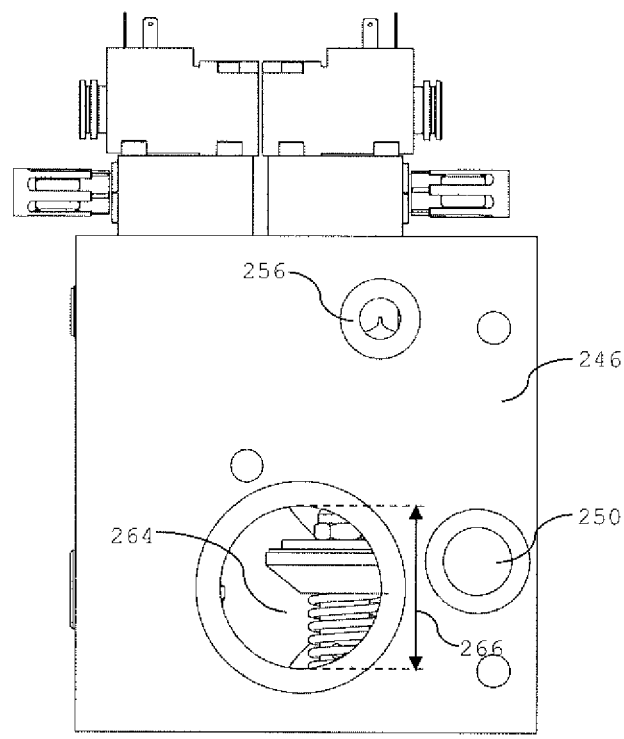
FIG. 13 is a rear view of the vacuum selector valve of FIG. 11.
Figure 14:
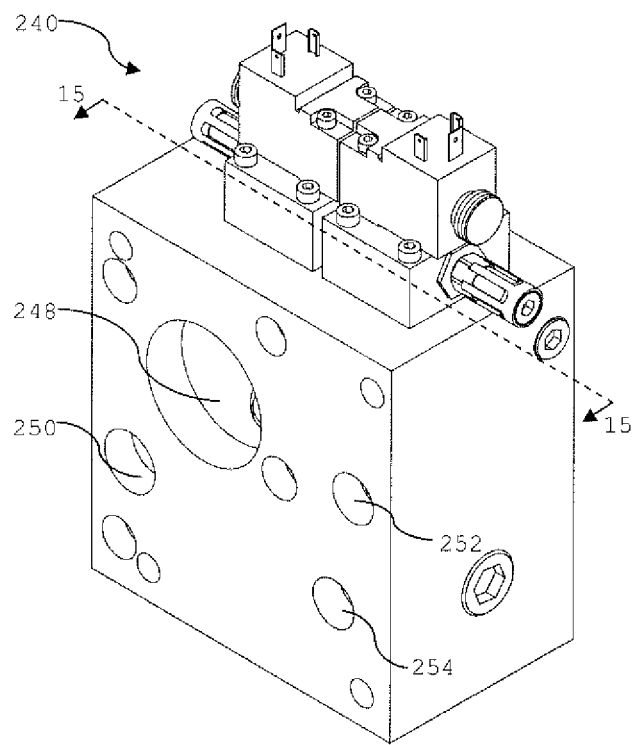
FIG. 14 is a perspective view of the vacuum selector valve of FIG. 11.

Referring to FIG. 13, the mounting face 246 of the housing 242 includes pilot pressure port 256 and pressurized air port 250 (as explained above) and a vacuum coupling port 264. The vacuum coupling port 264 is positioned so that when the housing 242 is mounted on housing 164, the vacuum coupling port 264 is registered with and coupled to vacuum port 166. In this configuration, the vacuum coupling port 264 provides fluid connection between the high vacuum port 248, low vacuum port 254 and the vacuum port 166. The vacuum coupling port 264 can be sized and shaped to generally correspond with the size and shape of vacuum port 166, and may have a diameter 266 that is generally equal to diameter 180.

Optionally, all of the openings on the mounting face 246 may be provided with gaskets, o-rings or other suitable sealing members to help provide a fluid tight seal between the ports on the mounting face 246 and the corresponding ports on the housing 164.

Figure 15:
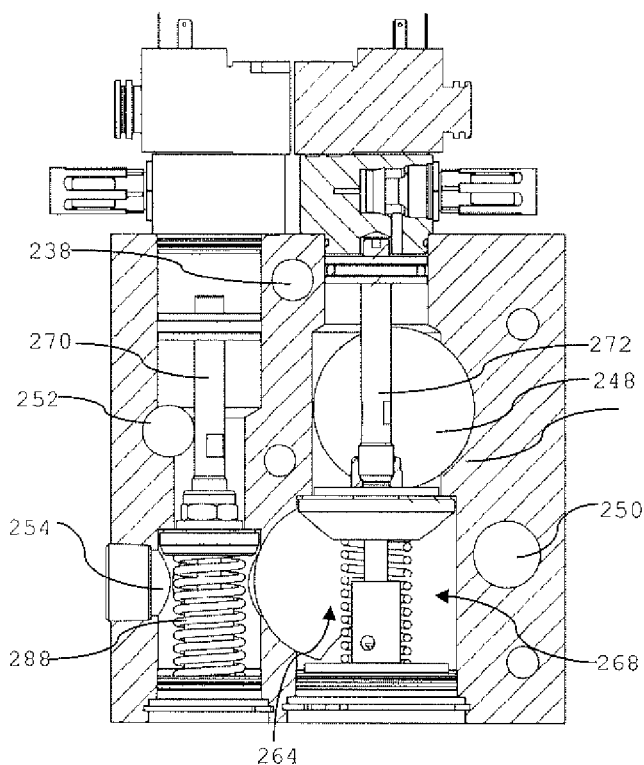
FIG. 15 is a cross-sectional view of the vacuum selector valve of FIG. 11, taken along line 15-15 in FIG. 14.

Referring to FIG. 15, in the illustrated example, the interior of the housing 242 defines a fluid flow channel, including a chamber 268 which fluidly connects high vacuum port 248, low vacuum port 254, vacuum brake port 252 and vacuum coupling port 264. A low vacuum closure member 270 and a high vacuum closure member 272 are positioned within the chamber 268, and can be selectably driven by respective ones of the actuators 262.

Referring to FIG. 15, in the illustrated example the low vacuum closure member 270 includes a sealing member 274 (such as a gasket, o-ring or other suitable member) that can contact and seal against a corresponding seat 276 in the chamber 268. The low vacuum closure 270 is moveable between an open position (FIG. 17) in which the sealing member 274 is spaced apart from seat 276 and the vacuum brake port 252 is fluid communication with the chamber 268, and a closed position (FIGS. 15 and 16) in which the sealing member 274 is sealed against seat 276 and fluid communication with the vacuum brake port 252 is blocked. In the illustrated example, the low vacuum closure member 270 is biased toward its closed position by a biasing member, for example spring 288.

Figure 16:
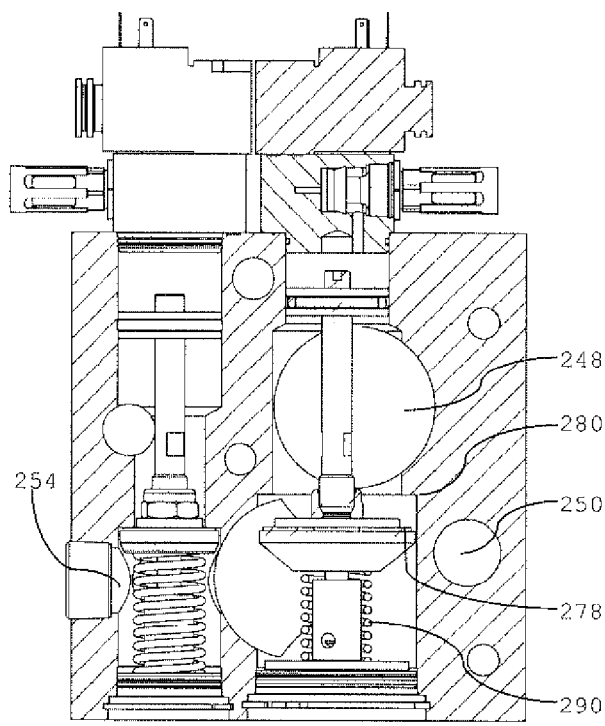
FIG. 16 is the cross-sectional view of FIG. 15, with a high vacuum actuator in an open position.

Similarly, referring to FIG. 16, the high vacuum closure member 272 includes a sealing member 278 that can contact and seal against a corresponding seat 280 in the chamber 286. The high vacuum closure member 272 is moveable between an open position (FIG. 16) the sealing member 278 is spaced apart from seat 280 and the high vacuum port 248 is in fluid communication with the chamber 268, and a closed position (FIGS. 15 and 17) in which the sealing member 278 is sealed against seat 280 and the high vacuum port 248 is fluidly isolated from the chamber 268. In the illustrated example, the high vacuum closure member 272 is biased toward its closed position by a biasing member, for example spring 290.

Referring to FIG. 15, to provide relatively low vacuum suction to vacuum port 166, the vacuum selector valve 240 can be configured to that both the low vacuum closure member 270 and the high vacuum closure member 272 are closed. In this configuration, the low vacuum port 254 is in fluid communication with the vacuum coupling port 264 and the vacuum port 166 connected thereto.

Referring to FIG. 16, to provide relatively high vacuum suction to vacuum port 166, the vacuum selector valve 240 can be configured to that the low vacuum closure member 270 is closed and the high vacuum closure member 272 is open. In this configuration, both the low vacuum port 254 and the high vacuum port 248 are in fluid communication with the vacuum coupling port 264 and the vacuum port 166 connected thereto, thereby providing relatively high levels of vacuum suction.

Figure 17:
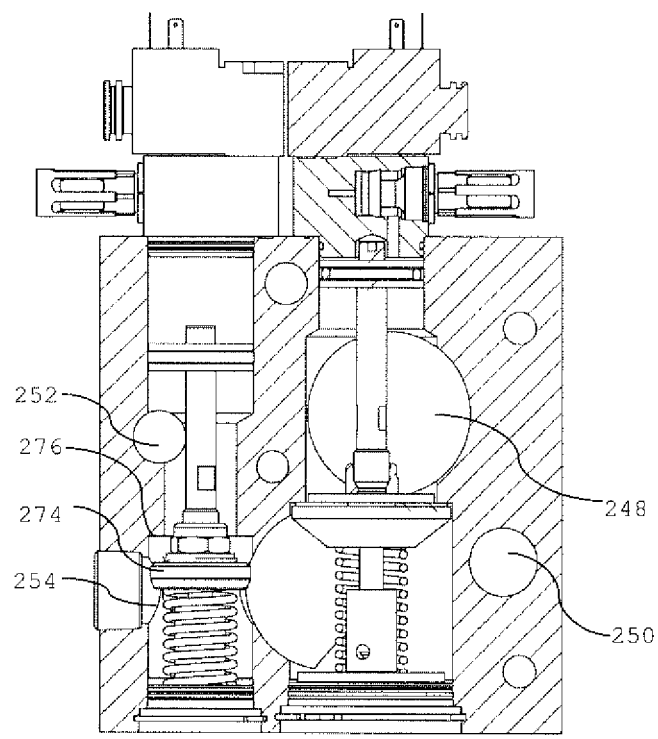
FIG. 17 is the cross-sectional view of FIG. 15, with a low vacuum actuator in an open position.

Referring to FIG. 17, to provide no vacuum suction (or virtually no vacuum suction) to vacuum port 166 (which may be useful, for example, when all of the vacuum closure members 192 are closed), the vacuum selector valve 240 can be configured to that the low vacuum closure member 270 is open and the high vacuum closure member 272 is closed. In this configuration, the high vacuum port 248 is fluidly isolated from the chamber 268, and the vacuum brake port 252 is in fluid communication with the low vacuum port 254, which permits air to drawn into the vacuum system from the surrounding atmosphere.

While illustrated in combination with the take-out plate 148, the valve assembly 160, or a variation thereof, may also be used in combination with the end station 162, cooling shell 142 or any other suitable part handling apparatus having a plurality of receivers. Optionally, the injection molding machine 100 may include two or more valve assemblies 160, associated with different part handling apparatuses.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A valve assembly for use with a part handling assembly of an injection molding machine, the part handling assembly having at least two sets of receivers, the valve assembly comprising:
   a) a housing having a first tooling port for fluid communication with a first set of receivers on the part handling apparatus and a second tooling port for fluid communication with a second set of receivers on the part handling apparatus;
   b) a first vacuum channel extending through the housing and providing fluid communication between the first tooling port and a vacuum source;
   c) a first vacuum closure member moveable between an open position, in which the first vacuum channel is open, and a closed position, in which the first vacuum channel is blocked, to selectably permit fluid communication between the first tooling port and the vacuum source;
   d) a first pressure channel extending through the housing and providing fluid communication between the first tooling port and a pressurized fluid source;
   e) a first pressure closure member moveable between an open position, in which the first pressure channel is open, and a closed position, in which the first pressure channel is blocked, to selectably permit fluid communication between the first tooling port and the pressurized fluid source, the first pressure closure member moveable independently from the first vacuum closure member;

f) a second vacuum channel extending through the housing and providing fluid communication between the second tooling port and the vacuum source;

g) a second vacuum closure member moveable between an open position, in which the second vacuum channel is open, and a closed position, in which the second vacuum channel is blocked, to selectably permit fluid communication between the second tooling port and the vacuum source;

h) a second pressure channel extending through the housing and providing fluid communication between the second tooling port and the pressurized fluid source;

i) a second pressure closure member moveable between an open position, in which the first pressure channel is open, and a closed position, in which the second pressure channel is blocked, to selectably permit fluid communication between the second tooling port and the pressurized fluid source, the second pressure closure member moveable independently from the second vacuum closure member.

2. The valve assembly of claim 1, wherein the first vacuum closure member is moveable independently from the second vacuum closure member.

3. The valve assembly of claim 1, wherein the housing further comprises a vacuum port, the first vacuum channel extends between the vacuum port and the first tooling port, and the second vacuum channel extends between the vacuum port and the second tooling port.

4. The valve assembly of claim 3, wherein the first vacuum closure member is the only closure member operable to block the first vacuum channel between the vacuum port and the first tooling port.

5. The valve assembly of claim 3, wherein the second vacuum closure member is the only closure member fluidly connected between the vacuum port and the second tooling port.

6. The valve assembly of claim 3, further comprising a vacuum header disposed within the housing and extending from, and in fluid communication with, the vacuum port, the vacuum header comprising a portion of both the first and second vacuum channels.

7. The valve assembly of claim 3, wherein the housing comprises a pressure port, the first pressure channel extends between the pressure port and the first tooling port, and the second pressure channel extends between the pressure port and the second tooling port.

8. The valve assembly of claim 7, further comprising a pressure header disposed within the housing and extending from, and in fluid communication with, the pressure port, the pressure header comprising a portion of both the first and second pressure channels.

9. The valve assembly of claim 8, further comprising a first internal chamber disposed within the housing and forming part of the first vacuum channel, the first internal chamber in fluid communication with first tooling port and comprising a first vacuum opening providing fluid communication between the vacuum header and the first internal chamber, wherein when the first vacuum closure member is in the closed position the first vacuum closure member seals the first vacuum opening.

10. The valve assembly of claim 9, wherein the first internal chamber further comprises a first pressure opening providing fluid communication between the pressure header and the first internal chamber, wherein when the first pressure closure member is in the closed position the first pressure closure member seals the first pressure opening.

11. The valve assembly of claim 9, further comprising a second internal chamber spaced apart from the first internal chamber and disposed within the housing, the second internal chamber forming part of the second vacuum channel, being in fluid communication with the second tooling port, and comprising a second vacuum opening providing fluid communication between the vacuum header and the second internal chamber, wherein when the second vacuum closure member is in the closed position the second vacuum closure member seals the second vacuum opening.

12. The valve assembly of claim 11, wherein the second internal chamber further comprises a second pressure opening providing fluid communication between the pressure header and the second internal chamber, and when the second pressure closure member is in the closed position the second pressure closure member seals the second pressure opening.

13. The valve assembly of claim 12, wherein the first vacuum opening comprises a first vacuum opening fluid flow area and the first pressure opening comprises a first pressure opening fluid flow area, and the first vacuum opening fluid flow area is at least 200% larger than the first pressure opening fluid flow area.

14. The valve assembly of claim 1, further comprising a first vacuum actuator connected to the first vacuum closure member and a first pressure actuator connected to the first pressure closure member, wherein the first vacuum actuator is independently actuatable from the first pressure actuator for independent movement of the first vacuum closure member and the first pressure closure member between respective open and closed positions.

15. The valve assembly of claim 1, wherein the first vacuum closure member is translatable along a first vacuum axis between the open and closed positions.

16. The valve assembly of claim 15, wherein the first pressure closure member is translatable along a first pressure axis between the open and closed positions.

17. The valve assembly of claim 16, wherein the first vacuum axis is generally parallel to and spaced apart from the first pressure axis.

18. The valve assembly of claim 17, wherein the second vacuum closure member is translatable along a second vacuum axis between its open and closed positions, and wherein the second vacuum axis is generally parallel to and spaced apart from the first vacuum axis.

19. The valve assembly of claim 1, wherein the housing is of unitary, integrally formed one-piece construction.

20. The valve assembly of claim 1, wherein the first vacuum channel is sized to accommodate a volumetric flow rate of between about 100 liters per minute and about 750 liters per minute.

21. The valve assembly of claim 1, further comprising a vacuum selector valve disposed in fluid communication between the vacuum source and the first tooling port.

22. A part handling assembly for use with an injection molding machine, the part handling assembly comprising:
 a) a first set of receivers for receiving a first set of molded articles;
 b) at least a second set of receivers adjacent the first set of receivers for receiving a second set of molded articles;
 c) a valve assembly for controlling airflow to the first and at least second sets of receivers, the valve assembly including:
  i) a housing having a first tooling port for fluid communication with a first set of receivers on the part handling apparatus and a second tooling port for fluid communication with a second set of receivers on the part handling apparatus;

ii) a first vacuum channel extending through the housing and providing fluid communication between the first tooling port and a vacuum source;

iii) a first vacuum closure member moveable between an open position, in which the first vacuum channel is open, and a closed position, in which the first vacuum channel is blocked, to selectably permit fluid communication between the first tooling port and the vacuum source;

iv) a first pressure channel extending through the housing and providing fluid communication between the first tooling port and a pressurized fluid source;

v) a first pressure closure member moveable between an open position, in which the first pressure channel is open, and a closed position, in which the first pressure channel is blocked, to selectably permit fluid communication between the first tooling port and the pressurized fluid source, the first pressure closure member moveable independently from the first vacuum closure member;

vi) a second vacuum channel extending through the housing and providing fluid communication between the second tooling port and the vacuum source;

vii) a second vacuum closure member moveable between an open position, in which the second vacuum channel is open, and a closed position, in which the second vacuum channel is blocked, to selectably permit fluid communication between the second tooling port and the vacuum source;

viii) a second pressure channel extending through the housing and providing fluid communication between the second tooling port and the pressurized fluid source; and ix) a second pressure closure member moveable between an open position, in which the first pressure channel is open, and a closed position, in which the second pressure channel is blocked, to selectably permit fluid communication between the second tooling port and the pressurized fluid source, the second pressure closure member moveable independently from the second vacuum closure member.

* * * * *